S. M. LILLIE.

CENTRIFUGAL FILTERING OR STRAINING APPARATUS.

No. 10,457. Reissued Mar. 4, 1884.

Witnesses:
Paul E. Seeber
Jos. T. Taylor.

Inventor:
S. Morris Lillie

UNITED STATES PATENT OFFICE.

S. MORRIS LILLIE, OF PHILADELPHIA, PENNSYLVANIA.

CENTRIFUGAL FILTERING OR STRAINING APPARATUS.

SPECIFICATION forming part of Reissued Letters Patent No. 10,457, dated March 4, 1884.

Original No. 252,783, dated January 24, 1882. Application for reissue filed January 28, 1884.

*To all whom it may concern:*

Be it known that I, S. MORRIS LILLIE, a citizen of the United States, residing at Philadelphia, in the county of Philadelphia and State of Pennsylvania, have invented a new and useful Centrifugal Filtering or Straining Apparatus, of which the following is a specification.

The object of my invention is to provide a centrifugal filtering-machine, the filtering media and the body or basket of which may be cleansed of the matters collected upon or in them during the filtering or straining process without the necessity of stopping the revolution of the machine for the purpose.

Figure 1:
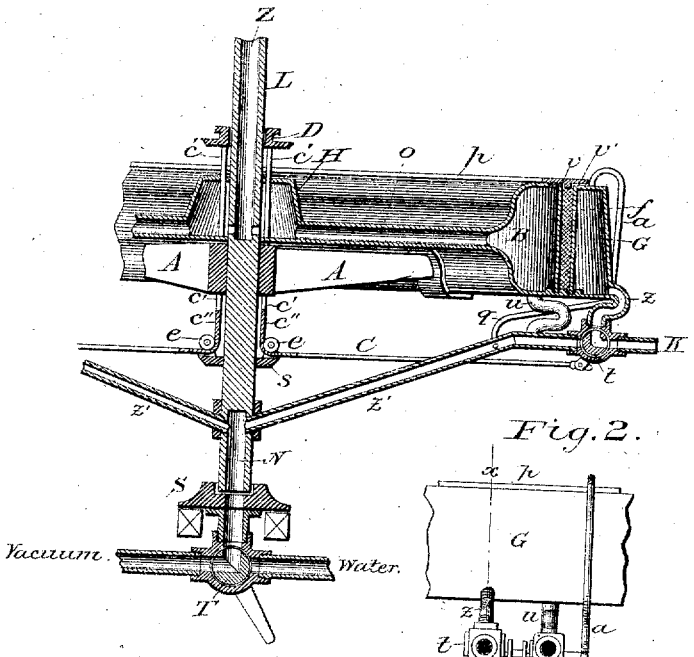
Figure 2:
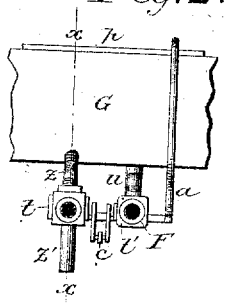

Other purposes of my invention and the means by which they are accomplished will appear from the following:

In the drawings accompanying this specification, Figure 1 is a vertical section of the machine along its axis and limited on one side of the same, and Fig. 2 is a detached view of certain parts.

Referring to the figures an annular basket, divided by an annular filtering-wall, *f*, into the two annular compartments B and G is supported by radial arms A horizontally upon a vertical axle, L, which latter is tubular above and below, the passage Z above being continued through the upper bearing (not shown) of the axle, and similarly the passage N below being continued through the lower bearing or step, S, the continuations of the two passages, each communicating with one or more pipes or conduits, as in the case of the lower passage, N, with the two mains marked, respectively, "Water" or "Vacuum" in Fig. 1. The inner annular compartment, B, is constructed so as to be water-tight toward the axle excepting that it communicates, by means of a series of radial tubes or passages, *o o*, with a central hopper, H, mounted on the axle, which hopper may be closed at will by means of the cap on the sleeve D, which latter may be raised and lowered while the machine is revolving by means of a lever (not shown) grasping a collar set in the groove in the sleeve in a manner precisely similar to that commonly employed for moving sleeves or clutches on revolving shafts. The upper axial passage, Z, communicates through suitable openings, *n*, with the central hopper, H, and through it and the radial passages *o o* with the chamber B.

The filtering-wall by which the body of the machine is divided into two annular compartments, B and G, is composed of the filtering material *f*, held between two annular perforated plates, *v v'*, so that liquids under heavy pressures may pass through the same in either direction without displacing the filtering material. The chamber G has a number of curved discharging-spouts, *z*, opening into it at its lower and outer edge, having their curves concave toward the axis of the machine and connecting with the axial tube N by pipes *z'*.

At the juncture of each discharge-pipe *z* with its pipe *z'* is a three-way faucet, *t*, bearing the nozzle K, which projects into a trough (not shown) encircling the machine, by which faucet the discharge-pipe *z* may be put in communication either with the pipe *z'* or with the nozzle K. The pipes *z'* (and consequently the axial tube N) have each an independent communication with the chamber G through a tube, *a*, which opens into the latter through the top. The chamber B has curved discharge-pipes *u*, similar to those *z* of the chamber G and the same in number, each pipe *u* being located at the side of a pipe *z*, but a little nearer the axle of the machine, and, like the latter, has a horizontal nozzle, F, projecting into the encircling trough and a faucet, *t'*, both of which are hidden from view in Fig. 1, but are shown in Fig. 2, which is a view of a portion of the face or periphery of the machine, and of which Fig. 1 is a section along the broken line *x*.

The levers of the faucets *t t'* of each pair of discharge-pipes *u* and *z* are connected in any suitable manner with a common operating-rod, *c*, which is connected with and is moved and controlled by the sleeve-cap D by means of the flexible connecting-band *c''*, passing around the friction-roller *e*, supported by the shoulder *s* on the axle L and the vertical rod *c'*, which extends through the bottom of the hopper H and is attached at its upper extremity to the cap D, and at its lower extremity to the connecting-band $c''$. When the cap D is raised, (which may be done, and also lowered, while the machine is in motion, as hereinbefore described,) the levers of the faucets $t$ and $t'$ are pulled toward the axle, which opens the communication between the discharge-pipe $z$ and the nozzle K (breaking that between the former and the pipe $z'$) and closes the discharge-pipe $u$. The lowering of the cap D while the machine is revolving allows the centrifugal force, acting upon the rod $c$ and the levers of the faucets $t\,t'$, which may be weighted, if necessary, to move the latter to the right, which opens the pipe $u$, so that the contents of the basket—*i. e.*, chamber B—may flow into the trough, and puts the discharge-pipe $z$ in communication with the pipe $z'$ and axial tube N. If while the cap H is thus lowered the faucet T be revolved, so as to turn water, or other liquid, for that matter, into the axial tube N, the water will flow through the tubes N, $z'$, and $z$, and also through the tube $a$ into the chamber G, and thence through the filtering medium $f$ into the basket or chamber B, and from it through the discharge-pipes $u$ into the trough surrounding the machine.

By having the axial tube Z in communication through the upper bearing of the axle with a vacuum apparatus, a vacuum may be induced in the chamber B to assist the flow of the liquid from G into B.

The curves in the discharge-pipes $z$ and $u$ serve as air-traps to prevent the flow of air through the pipes to destroy the vacuum induced in G or B, as the case may be, for during the revolution of the machine a very considerable pressure will be required, owing to the centrifugal force developed by the rapid revolution of the machine, to force the liquid contained in the curves of the tubes out of the same, to permit the passage of air in either direction through the said tubes.

Having now described the construction of my machine, I will describe the process of filtering a liquid—a sugar-liquor, for example—through the same. The cap D being raised, which closes the discharge-pipe $u$, and connects the discharge-pipe $z$ with the nozzle K, and the valve T being turned so that a vacuum will be induced in the chamber G in virtue of its communication through the pipes $a$ $z$, and the axial tube N with the vacuum-inducing apparatus, the liquor to be filtered is run into the central hopper, H, whence it flows into the basket B, and, urged by the centrifugal force and the vacuum induced in the chamber G, filters through the filtering medium $f$ into the chamber G, and flows thence through the pipe $z$ into the encircling trough. The liquor is run into the hopper continuously and rapidly enough to keep the chamber B and passages $o$ $o$ filled as far back as the hopper H, in order to obtain as great a filtering-pressure as possible. The pressure of the liquor upon the filtering medium—that is, per unit of surface—depends entirely upon the radial depth of the liquor pressing against the filtering medium, and not at all upon the vertical thickness of the same nor upon its quantity, and consequently as great pressure is obtained with a radially thin basket or chamber, B, and long radial tubes $o$, of the machine shown in the drawings, as if the chamber were deeper radially and the tubes $o$ correspondingly shorter, and so, as far as the pressure and the rate of filtration are concerned, the chamber B may be as thin radially or as thick as may be desired. The thinner the chamber the less weight of liquor the machine has to carry. When, at length, so much liquor has passed through the machine that the filtering medium begins to grow clogged, and the liquor to flow slowly from the pipes $z$, the flow of the liquor into the hopper is stopped, that in the chamber B is allowed to filter off, and then a small quantity of water is run into the hopper to wash the remains of the liquor from the filtering medium. This having been done, the cap D is lowered, the cock T is reversed so as to turn the water into the axial tube N, and the vacuum-inducing apparatus is put in communication with the axial tube Z—*i. e.*, if the latter has a connection with the vacuum apparatus. The water, urged by the centrifugal force and the vacuum in B, flows through the tubes $z$ and $z'$ into the chamber G, thence through the filtering medium $f$ into the chamber B, and finally from the latter it flows through the tube $u$ into the encircling trough. In its passage through the filtering medium and the chamber B the water thoroughly cleanses the former and washes from the latter the matters that may have collected therein during the filtration. This cleansing operation having been completed, the axial tube Z is shut off from the vacuum apparatus, the cock T is turned so that the communication of the axial tube N shall be with the vacuum apparatus and not with the water-main, the cap D is raised and the liquor is again run into the hopper H continuously until the filtration again becomes slow, owing to the clogging of the filtering medium, and it becomes necessary to repeat the cleansing operation. Thus it is seen that without once stopping the machine the filtering and cleansing processes may alternate with each other until all the liquor has been filtered that it is wished to filter.

The construction of this machine may be varied considerably in its details. Thus the hopper H may be dispensed with by having the radial tubes $o$ communicate with the axial tube Z, through which, in that case, the liquor might be led into the basket of the machine. Again, a second central hopper might be located on the axle of the machine below the basket, with which hopper the pipes $z'$ $z'$ and the axial tube N would communicate. This second hopper would also have a sleeve-cap similar to the cap D of the hopper H, by which it might be closed tightly, and would be used to receive the washing-water as the hopper H does the liquor; and so in this case the axial tube N would only communicate with the vacuum apparatus through the step S. Again, the filtering-surface might be greatly increased by having the perforated plates $v'$ $v$, and consequently the filtering medium, also deeply corrugated or waved.

I have omitted to state that access may be had to the interior of the annular body of this machine by removing one or more sections of which the circular plate $p$, forming a part of the top of the said annular body, is composed.

Thus having described my invention and explained its operation, I claim as mine and desire to secure to myself by Letters Patent of the United States—

1. In a centrifugal machine, an annular basket, B, consisting of an annular hollow shell supported on the axial tube by suitable radial supports, and whose outer wall consists of a sieve or straining medium, in combination with a central hopper having radial tubes or passages leading into the annular basket and making liquid and air tight junctions with the shell of the same, the hopper and radial passages affording means for introducing a liquid or semi-liquid into the basket while the machine is in motion, substantially as specified.

2. The combination, in a centrifugal machine, of a basket to hold the material to be drained or filtered, a chamber or chambers surrounding the basket and revolving with it, into which the drained or filtered liquid flows from the basket, and discharging-pipes through which the liquid may flow from the chamber or chambers while the machine is in motion, substantially as specified.

3. The combination, in a centrifugal machine, of two concentric chambers formed in the annular body of the machine by an annular straining-partition, and tubes leading from the outer chamber and communicating, through the axle and bearing for the same, with one or more conduits, substantially as specified.

4. A centrifugal machine having an annular basket to hold the material to be drained or filtered, a chamber or chambers surrounding the basket and revolving with it, into which the filtered or strained liquid flows from the basket, in combination with any suitable vacuum apparatus communicating, through the bearing and axle of the machine, with the chamber or chambers surrounding the basket of the same, substantially as specified.

5. In a centrifugal machine, the combination, with the chamber surrounding and revolving with the basket, of discharge-pipes curved so that the liquid will, while the machine is revolving, form air-traps and prevent any flow of air through the said pipes while the machine is in motion, substantially as specified.

6. The combination of a centrifugal machine having a basket arranged to be tightly closed toward the axle, a suitable vacuum-inducing apparatus, and an axial communication between the vacuum-inducing apparatus and the basket of the machine, substantially as specified.

7. In a centrifugal machine, the combination of an annular basket for holding the material to be drained or filtered, axial passages through the bearings and axle, and radiating tubes connecting the axial passages with the annular basket, substantially as specified.

8. The combination, in a centrifugal machine, of a central hopper communicating with the basket of the machine by suitable passages, and a sleeve-cap, D, on the axle, by which the mouth of the hopper may be closed, substantially as specified.

9. The combination, in a centrifugal machine, of an annular basket, for holding the material to be subjected to centrifugal force, and arranged to be tightly closed toward the axle, a central hopper communicating with the annular basket through suitable passages, a sleeve-cap on the axle of the machine, by which the mouth of the central hopper may be closed, and an axial passage through the axle and bearing of the same, communicating with the annular basket, substantially as specified.

10. The combination, in a centrifugal machine, of two concentric chambers formed in the body of the machine by an annular straining-partition, and two series of discharge-spouts of one or more spouts each, one series for each of the two chambers, substantially as described.

11. The combination, in a centrifugal machine, of the outer annular chamber, G, inner annular chamber, B, and intervening straining medium, and discharging-spouts furnished with suitable faucets for the outer chamber, or for the inner chamber, or for both chambers, substantially as specified.

12. The combination, in a centrifugal machine, of two annular chambers and intervening straining medium, discharge-spouts for the outer chamber, faucets or valves for the said spouts, and means for operating the faucets or valves while the machine is revolving, substantially as specified.

13. The combination, in a centrifugal machine, with the annular basket for holding the material to be strained, of a discharging spout or spouts, faucets or valves for the same, and means for operating the faucets or valves while the machine is revolving, substantially as specified.

14. The combination, in a centrifugal machine, of two concentric chambers and intervening straining medium, a series of discharge-spouts—one or more—each having a suitable faucet or valve for the outer chamber, the same for the inner chamber, and mechanism for operating the cocks or valves of the two series of spouts while the machine is revolving, substantially as specified.

15. The combination, in a centrifugal machine, of two concentric chambers, intervening straining-wall, and means for introducing a liquid into the outer chamber while the machine is in motion.

16. The combination, in a centrifugal machine, of two concentric chambers, a filtering-wall separating the two, and means for causing a flow of liquid at will through the filtering-wall in either direction—*i. e.*, from either chamber into the other—substantially as specified.

17. In a centrifugal machine having its body divided into two concentric compartments by an annular filtering-wall, the combination, with the outer of the two compartments, of the draining-spout *z*, nozzle K, pipe *z'*, connecting with an axial tube, N, and the cock *t*, for putting the draining-spout *z* in communication with either the nozzle K or pipe *z'*, substantially as described.

18. In a centrifugal machine having its basket for holding the material to be strained or filtered surrounded by a chamber, G, the combination, with the chamber, of pipes *a*, opening into the chamber through the top and communicating with a passage through the axle and bearing of the machine, and discharging ports or spouts for the chamber at the bottom of the same, substantially as specified.

19. In a centrifugal machine having its basket for holding the material to be strained or filtered encircled by a chamber, G, the combination, with the chamber, of means for introducing a liquid into it at the top while the machine is revolving, and ports or means for the escape of the liquid from the bottom of the chamber, substantially as specified.

20. In a centrifugal machine, the combination, with the basket for holding the material to be strained, of means or mechanism for drawing off liquid or semi-fluid matters from the basket while the machine is revolving independently of the permeable straining-wall or periphery of the basket, substantially as specified.

21. The within-described process of removing the matter collected in the basket B of a centrifugal machine, consisting in washing the same from the basket through suitable discharging-spouts, as *u*, by means of a current of liquid caused to flow through the filtering-wall into the basket and out of it through the said spouts, substantially as specified.

22. The within-described process of cleansing the filtering medium of a centrifugal machine, consisting in causing a flow of cleansing-liquid through the said filtering medium in a direction contrary to that of the filtration, through the agency of the centrifugal force developed by the revolution of the machine, substantially as specified.

S. MORRIS LILLIE.

Witnesses:

PAUL E. SEEBER,
JOS. T. TAYLOR.